US008063752B2

(12) United States Patent
Oleg (10) Patent No.: US 8,063,752 B2
(45) Date of Patent: Nov. 22, 2011

(54) CAMERA UNIT WITH DRIVING CORRIDOR DISPLAY FUNCTIONALITY FOR A VEHICLE, METHOD FOR DISPLAYING ANTICIPATED TRAJECTORY OF A VEHICLE, AND SYSTEM FOR GENERATING DRIVING CORRIDOR MARKERS

(75) Inventor: Konevsky Oleg, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 311 days.

(21) Appl. No.: 12/335,256

(22) Filed: Dec. 15, 2008

(65) Prior Publication Data

US 2010/0085170 A1   Apr. 8, 2010

(30) Foreign Application Priority Data

Oct. 2, 2008   (KR) .......................... 10-2008-0096904

(51) Int. Cl.
*B60Q 1/00*   (2006.01)
(52) U.S. Cl. ............. 340/425.5; 340/426.1; 340/426.31; 340/435; 340/438; 340/439; 701/200; 701/205
(58) Field of Classification Search ............... 340/425.5, 340/426, 426.31, 435, 436, 438, 439; 701/200, 701/205
See application file for complete search history.

(56) References Cited

U.S. PATENT DOCUMENTS

| | | | | |
|---|---|---|---|---|
| 5,717,847 A | * | 2/1998 | Schulmeiss | 345/442 |
| 7,039,521 B2 | * | 5/2006 | Hortner et al. | 701/211 |
| 2001/0027363 A1 | * | 10/2001 | Shimazaki et al. | 701/41 |
| 2008/0079607 A1 | * | 4/2008 | Uemura | 340/932.2 |

FOREIGN PATENT DOCUMENTS

| | | |
|---|---|---|
| DE | 42 44 462 A1 | 6/1994 |
| DE | 100 64 036 B4 | 7/2001 |
| DE | 101 38 719 A1 | 3/2003 |
| WO | WO 2008/074458 A1 | 6/2008 |

OTHER PUBLICATIONS

English Translation of German Office Action issued in German Patent Application No. 10 2008 062 121.8-51, dated Jul. 1, 2009.

* cited by examiner

*Primary Examiner* — Daryl Pope
(74) *Attorney, Agent, or Firm* — McDermott Will & Emery LLP

(57) ABSTRACT

A method and apparatus for driving corridor markers display are disclosed in the invention. The steering angle is obtained and the parameters of driving corridor image are selected correspondingly from the non-volatile memory. The parameters are used to calculate the locus of the nodes, using the equation of quadratic or cubic Bezier curves. The nodes are connected with the segments, thus forming the driving corridor image. The driving corridor image is superimposed on the image acquired from the sensor, and the resulting image is displayed.

18 Claims, 7 Drawing Sheets

[FIG. 1]

REAR VIEW CAMERA

[FIG. 2]

VEHICLE DIMENSIONS MARKERS

[FIG. 3A]

DRIVING CORRIDOR
MARKERS, STEERING ANGLE = -20 DEG.

[FIG. 3B]

DRIVING CORRIDOR
MARKERS, STEERING ANGLE = 0 DEG.

[FIG. 3C]

DRIVING CORRIDOR
MARKERS, STEERING ANGLE = +20 DEG.

[FIG. 4]

- PRIOR ART -

[FIG. 5]

- PRIOR ART -

CAMERA UNIT WITH DRIVING CORRIDOR DISPLAY FUNCTIONALITY FOR A VEHICLE, METHOD FOR DISPLAYING ANTICIPATED TRAJECTORY OF A VEHICLE, AND SYSTEM FOR GENERATING DRIVING CORRIDOR MARKERS

CROSS-REFERENCE TO RELATED APPLICATIONS

This application claims the benefit of Korean Patent Application No. 10-2008-0096904 filed with the Korea Intellectual Property Office on Oct. 2, 2008, the disclosure of which is incorporated herein by reference.

BACKGROUND OF THE INVENTION

1. Field of the Invention

The present inventive concept relates to a camera system, comprising at least one image sensor based camera unit, attached to the vehicle in order to improve the safety of driving, and a method for displaying anticipated trajectory of a vehicle and a system for generating driving corridor markers.

2. Description of the Related Art

Figure 1:
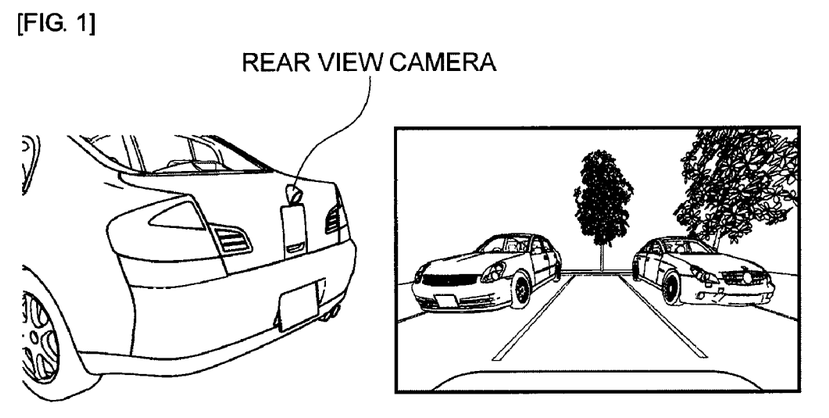
FIG. 1 illustrates a vehicle with the attached camera unit, as well as the image displayed on the monitor.

Image sensor based cameras are becoming widely used in the vehicles. By capturing a portion of the environment surrounding the car and displaying it on the monitor in front of driver, the system enables better sense of the location and orientation of the vehicle with respect to the other objects (other vehicles, pedestrians, cyclists, buildings, trees, road and parking lot marking, etc.), improves control over the traffic situation, thus improving the safety of driving. In particular, as illustrated in FIG. 1, the camera attached to the rear part of the vehicle (rear view camera) captures the area behind the vehicle, which normally cannot be seen from the driver's seat. Likewise, the front view camera may be attached to the front part of the vehicle, and captures the area in front of the vehicle.

The camera unit is preferably small enough to be placed in the rear panel boot lid or grill of the vehicle without spoiling the appearance of the vehicle.

In order to maximize the area captured by the camera and displayed on the monitor, the rear-view cameras incorporate the lenses with wide field of view (FOV), typically 120-135°, in some cases up to 190°. The disadvantage of such cameras is, that due to the difference between the FOV of the camera and average FOV of human vision, the distant objects captured by the camera appear smaller compared to the near objects, than a human would expect. This disproportion may cause confusion: it becomes hard to estimate the dimensions of the driven car with respect to other objects shown on the captured image.

Figure 2:
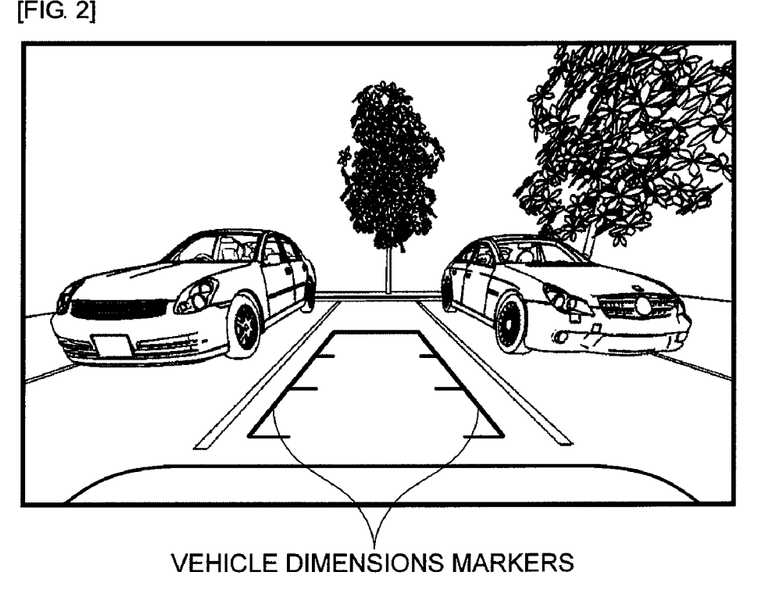
FIG. 2 shows the image with the markers depicting the vehicle dimensions (static overlay).

In order to overcome this problem, as shown in FIG. 2, markers depicting the dimensions of the vehicle against the object distance are displayed along with the image captured by the camera. As soon as the markers do not change according to the steering angle, this kind of displayed markers is often referred to as "static overlay."

Figure 3A:
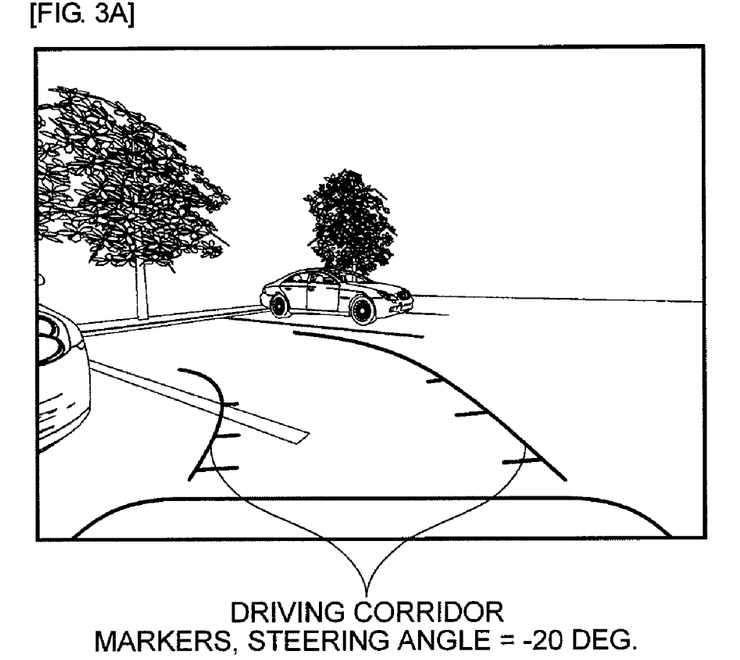
FIGS. 3A, 3B and 3C show the image with the markers depicting the driving corridor for the steering angle −20 deg, 0 deg, and +20 deg. correspondingly.
Figure 3B:
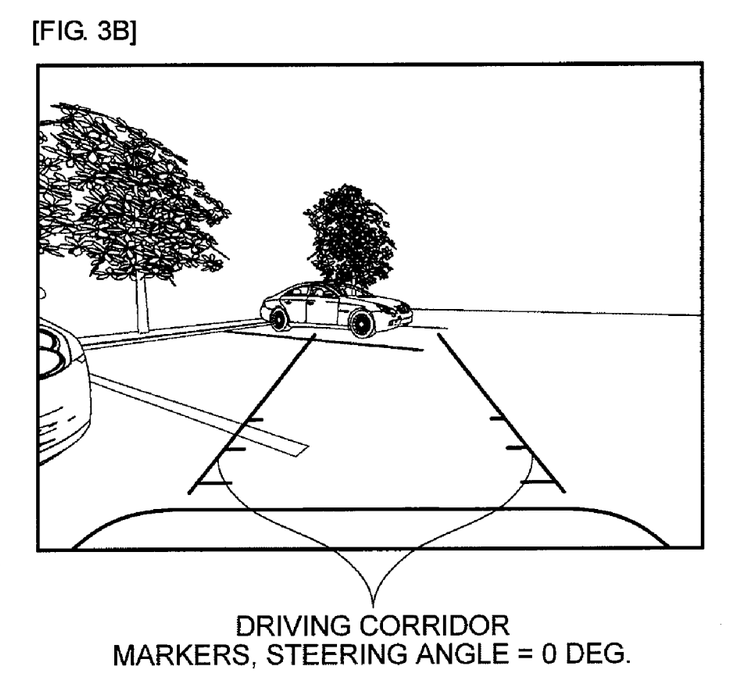
Figure 3C:
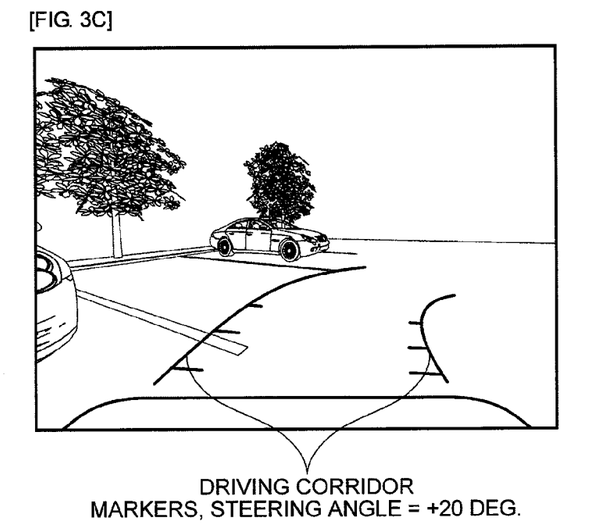

In order to make driving even safer and easier, especially when maneuvering in close space, like garage, or parking lot, the camera systems may feature display of driving corridor, often referred to as "dynamic overlay." This function is similar to static overlay, except the markers depicting the dimensions of the vehicle change according to the steering angle. Thus, the driving corridor displays the suppositional trajectory of the vehicle with respect to the surrounding objects, assuming the vehicle is driven with the current steering angle. If the driver changes the steering angle by turning the steering wheel, the displayed driving corridor changes accordingly (FIG. 3).

In order to implement such functionality, the camera system has to communicate with other devices of the vehicle, for example steering wheel, typically via controller area network (CAN) bus or local interconnect network (LIN) bus, in order to acquire the descriptor of steering angle, although the other interfaces may be used. Therefore, the camera system incorporates an interface transceiver and interface controller. The interface controller usually incorporates a microprocessor with the processing power just enough to support input/output functions and basic calculus, random access memory (RAM) for program and data, and non-volatile (ROM, flash) memory to store the program code and data (parameters).

In order to produce the displayed image with dynamic overlay, the camera system incorporates image processing device. This device inputs the image captured by image sensor, adds the overlay to be displayed, and transmits the resulting image to the monitor, typically as analog signal, NTSC or PAL.

In order to generate the overlay image, the image processing device inputs the descriptor of steering angle from the interface controller via $I^2C$ or any other available interface. Then, according to the steering angle, the location of the markers depicting driving corridor on the image, is calculated by image processing device and superimposed on the image acquired from the image sensor.

Typical frame of the video displayed on the monitor, contains about 350,000 elements (pixels). Therefore, the image processing device must be capable of processing this number of elements with the required frame rate, usually about 30 frames per second.

At the moment, there are three classes of devices that possess sufficient processing power: Digital Signal Processor (DSP), Field Programmable Gate Array (FPGA), Complex Programmable Logic Device (CPLD), and Application Specific Integrated Circuits (ASIC).

Figure 4:
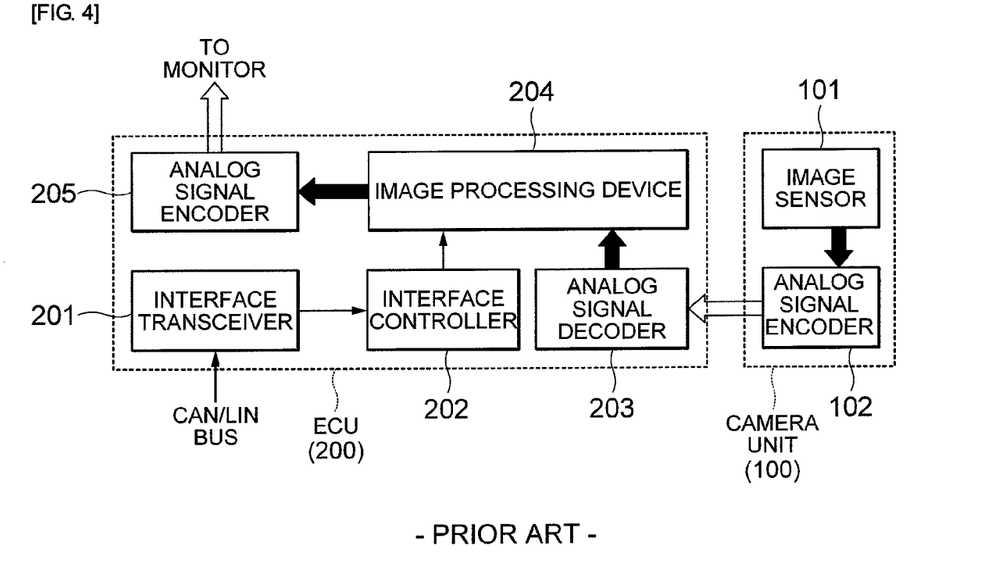
FIG. 4 is a block diagram of a camera system architecture according to a prior art.

An example of known state of the art architecture of the camera system is shown in the FIG. 4. The system comprises two parts, i.e. a camera unit 100 and an electronic control unit (ECU) 200.

ECU 200 comprises an image processing device (DSP, FPGA CPLD or ASIC) 204, an interface transceiver 201, an interface controller 202, an analog decoder 203 and an analog signal encoder 205.

Camera unit 100 outputs the image obtained by an image sensor 101 as an analog (typically NTSC/PAL) signal, which is transmitted to ECU 200 via an analog signal encoder 102.

The analog signal decoder 203 on ECU 200 converts the signal into digital signal, which is acquired by the image processing device 204. Steering angle descriptor is acquired by the interface transceiver 201 and transmitted to the interface controller 202. The interface controller 202, in turn, transmits the corresponding data to the image processing device 204. Based on that data, the image processing device 204 generates corresponding driving corridor markers, superimposes them on the image acquired from the camera unit 100 separated from ECU 200, and transmits the resulting image to the analog signal encoder 205, which converts the image into analog signal and transmits it to the monitor.

Figure 5:
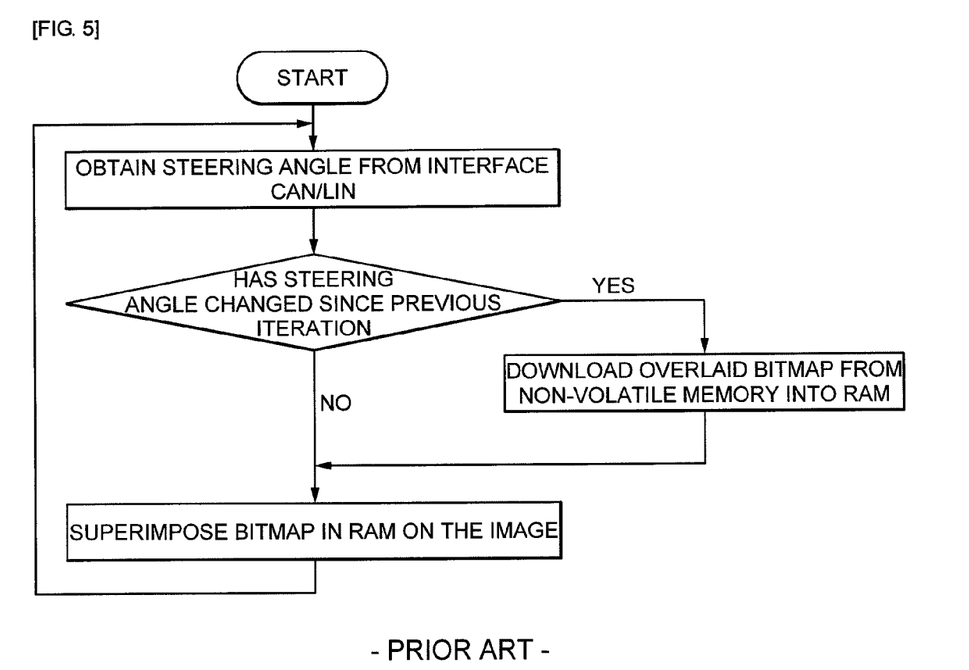
FIG. 5 is a flow chart of a method of dynamic overlay according to a prior art.

One of the commonly used state of the art methods to generate the driving corridor markers is as follows (FIG. 5). The bitmap depicting the overlay, usually one per each steering angle value, are stored in the non-volatile memory in ECU 200. The image processing device 204 obtains the steering angle value from the interface controller 202, downloads the corresponding bitmap from the non-volatile memory into RAM and superimposes it on the image acquired from the image sensor 101 in the separate camera unit 100.

Note, that the amount of non-volatile memory required to store overlaid bitmaps covering the whole range of steering angles is relatively large, thus increasing the overall size and cost of the system.

The main disadvantages of this conventional architecture are as follows:

1. Camera system comprises at least two separate devices (camera unit and ECU), because, due to the limitations of camera size, it is not possible to embed the image processing device with sufficient processing power and/or sufficiently large non-volatile memory to store overlaid bitmaps into the camera unit. The use of multiple devices results in higher system complexity, higher cost, overall dimensions, weight, etc.

2. The image acquired by the camera unit is transmitted to ECU over analog signal, because due to significant distance between the camera unit and ECU state of the art digital interfaces are not sufficiently robust against noise, require more than two wires or have insufficient bit rate. However, due to multiple digital-to-analog and analog-to-digital conversions required for analog interface, the image quality degrades significantly.

SUMMARY OF THE INVENTION

An advantage of the present inventive concept is to provide the camera unit enabling driving corridor display function without external ECU.

In one aspect of the present inventive concept, the task of generating the driving corridor markers is distributed between the interface controller and image processing device. This enables image processing device to be small enough to fit into camera unit housing.

In another aspect of the present inventive concept, the method of generating the driving corridor enables calculus to be made by the microprocessor with small processing power, such as microprocessor embedded in interface controller and with the use of RAM available on a typical interface controller.

In another aspect of the present inventive concept, the number of parameters required to generate driving corridor markers is small enough to fit limited non-volatile memory available in the interface controller.

In another aspect of the present inventive concept, the amount of data transmitted between interface controller and image processing device is small enough for standard commonly used interfaces, such as I²C, although the other interface might be used without departing from the scope of the present invention.

Another advantage of the present inventive concept is that it enables the image acquired by the image sensor to be transmitted to the image processing device over standard commonly used digital interface, such as parallel 8/10 bit interface. This results in better image quality due to the absence of multiple digital-to-analog analog-to-digital conversions. It also enables to eliminate analog signal decoder and analog signal encoder from the camera system architecture, making the camera system less complex and expensive.

Another advantage of the present inventive concept is that it enables adjustments of the displayed driving corridor by changing the parameters stored in the nonvolatile memory and used to generate the displayed image.

Additional aspects and advantages of the present general inventive concept will be set forth in part in the description which follows and, in part, will be obvious from the description, or may be learned by practice of the general inventive concept.

According to an aspect of the present inventive concept, there is provided a camera unit with driving corridor display functionality for a vehicle, comprising: an image sensor configured to obtain an image outside the vehicle; an interface controller configured to generate a plurality of nodes of a driving corridor image for a required steering angle, the plurality of nodes being calculated as points on Bezier curve; and an image processing device configured to generate driving corridor markers and to superimpose the driving corridor markers on the image transmitted from the image sensor, the driving corridor markers being calculated in the image processing device on the basis of coordinates of the nodes transmitted from the interface controller and being generated by connecting the nodes adjacent to each other with line segments.

The image sensor, the interface controller and the image processing device are all embedded in one camera unit.

The plurality of nodes is calculated by the following quadratic Bezier curve equation:

$$X(t)=X_0(1-t)^2+X_1 2t(1-t)+X_2 t^2$$

$$Y(t)=Y_0(1-t)^2+Y_1 2t(1-t)+Y_2 t^2$$

where $X_0$, $Y_0$, $X_1$, $Y_1$, $X_2$, and $Y_2$ are the coordinates of control points, and t is a parameter, changing in the range of [0, 1].

The plurality of nodes is calculated by the following cubic Bezier curve equation:

$$X(t)=X_0(1-t)^3+X_1 3t(1-t)^2+X_2 3t^2(1-t)+X_3 t^3$$

$$Y(t)=Y_0(1-t)^3+Y_1 3t(1-t)^2+Y_2 3t^2(1-t)+Y_3 t^3$$

where $X_0$, $Y_0$, $X_1$, $Y_1$, $X_2$, $Y_2$, $X_3$, and $Y_3$ are the coordinates of control points, and t is a parameter, changing in the range of [0, 1].

The plurality of nodes is calculated from a set of control points of Bezier curve for a required steering angle and the set of control points is stored in a non-volatile memory of the interface controller in a form of look-up table.

The control points of Bezier curve for the required steering angle are calculated using linear interpolation between the values loaded from the look-up table.

The line segments connecting the nodes adjacent to each other of the set of nodes calculated and transmitted from the interface controller are calculated using the Bresenham's line algorithm.

The camera unit for a vehicle further comprises an interface transceiver configured to receive and transmit a signal corresponding to a varying steering angle, the interface transceiver being outside the interface controller separately or being a part of the interface controller.

The camera unit for a vehicle further comprises an analog signal encoder configured to transmit the obtained image with driving corridor markers superimposed on it to an external display device, the analog signal encoder being outside the image processing device separately or being a part of the image processing device.

According to another aspect of the present inventive concept, there is provided a method for displaying anticipated trajectory of a vehicle, comprising the steps: detecting a variation of steering angle of a vehicle; loading or calculating a set of control points of Bezier curve according to the variation of steering angle, and calculating a plurality of nodes using Bezier curve equation, the plurality of nodes being used for generating a driving corridor line on the basis of the loaded or calculated set of control points; calculating line segments and connecting the nodes adjacent to each other with the line segments; and superimposing an overlay with the line segments on an image obtained by an image sensor and displaying the superimposed image on an external display device.

The plurality of nodes is calculated by the following quadratic Bezier curve equation:

$$X(t)=X_0(1-t)^2+X_12t(1-t)+X_2t^2$$

$$Y(t)=Y_0(1-t)^2+Y_12t(1-t)+Y_2t^2$$

where $X_0$, $Y_0$, $X_1$, $Y_1$, $X_2$, and $Y_2$ are the coordinates of control points, and t is a parameter, changing in the range of [0, 1].

The plurality of nodes is calculated by the following cubic Bezier curve equation:

$$X(t)=X_0(1-t)^3+X_13t(1-t)^2+X_23t^2(1-t)+X_3t^3$$

$$Y(t)=Y_0(1-t)^3+Y_13t(1-t)^2+Y_23t^2(1-t)+Y_3t^3$$

where $X_0$, $Y_0$, $X_1$, $Y_1$, $X_2$, $Y_2$, $X_3$, and $Y_3$ are the coordinates of control points, and t is a parameter, changing in the range of [0, 1].

The set of control points of Bezier curve for a required steering angle is stored in a non-volatile memory of the interface controller in a form of look-up table, and in case where the look-up table does not have the data for the required steering angle, the control points of Bezier curve are calculated using linear interpolation between the values stored in the look-up table.

Calculation of the node is performed in an interface controller using Bezier curve equation while calculation of the line segments is performed in an image processing device using the Bresenham's line algorithm.

Both calculation of the plurality of nodes and calculation of the line segments are all performed in one camera unit.

According to another aspect of the present inventive concept, there is provided a system for generating driving corridor markers which are displayed to be superimposed on an image of the vehicle's periphery, wherein the driving corridor markers are dynamically-changed and overlaid to the image obtained by an image sensor in a camera unit according to variation of steering angle and the dynamic change of the markers is generated from calculation of coordinates of a plurality of nodes according to one of the following quadratic and cubic Bezier curve equations and calculation of line segments connecting the plurality of nodes:

$$X(t)=X_0(1-t)^2+X_12t(1-t)+X_2t^2,$$

or $$Y(t)=Y_0(1-t)^2+Y_12t(1-t)+Y_2t^2$$

$$X(t)=X_0(1-t)^3+X_13t(1-t)^2+X_23t^2(1-t)+X_3t^3$$

$$Y(t)=Y_0(1-t)^3+Y_13t(1-t)^2+Y_23t^2(1-t)+Y_3t^3$$

where $X_0$, $Y_0$, $X_1$, $Y_1$, $X_2$, $Y_2$, $X_3$, and $Y_3$ are the coordinates of control points, and t is a parameter, changing in the range of [0, 1].

The plurality of nodes is calculated from a set of control points of Bezier curve according to the variation of steering angle.

The plurality of nodes is calculated by an interface controller outside an image processing device.

Connecting the plurality of nodes with the line segments is performed by the image processing device.

The interface controller and the image processing device are all embedded in one camera unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

The present inventive concept will now be described more fully with reference to the accompanying drawings, in which exemplary embodiments of the invention are shown. The present inventive concept may, however, be embodied in many different forms and should not be construed as being limited to the embodiments set forth herein; rather, these embodiments are provided so that this disclosure will be thorough and complete, and will fully convey the concept of the invention to those skilled in the art. In the following description, well-known functions or constructions are not described in detail since they would obscure the invention in unnecessary detail.

Although terms like "first" and "second" are used to describe various elements, these elements are not limited to these terms. These terms are used only to differentiate one element from another.

Terms used herein are for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, and/or groups thereof, but do not preclude the presence or addition of one or more other features, numbers, steps, operations, elements, components, and/or groups thereof.

Hereafter, the detailed description of the invention will be provided in form of its preferred embodiment.

Figure 6:
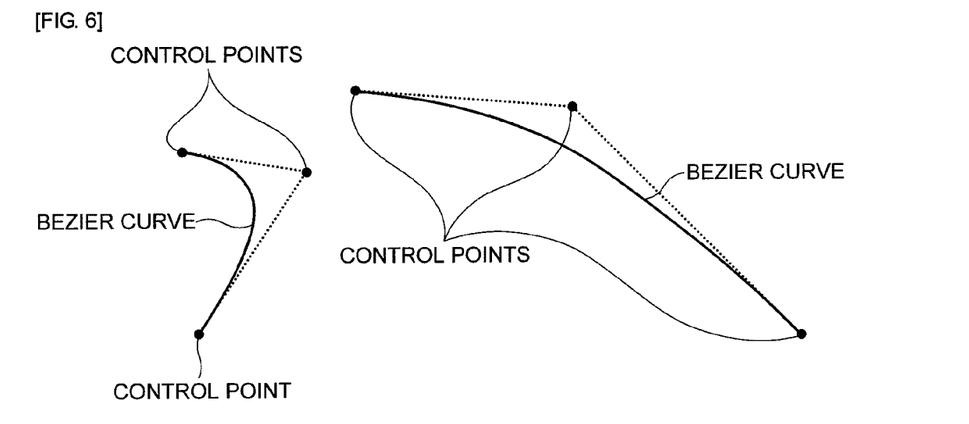
FIG. 6 illustrates the approximation of the driving corridor markers with the cubic Bezier curves, defined by means of coordinates of their control points.

According to the preferred embodiment of the invention, the driving corridor markers to be superimposed on the image captured by the image sensor are approximated by a plurality of quadratic or cubic Bezier curves, as shown in FIG. 6. FIG. 6 illustrates the approximation of the driving corridor markers with the cubic Bezier curves, defined by means of coordinates of their three (3) control points.

Figure 7:
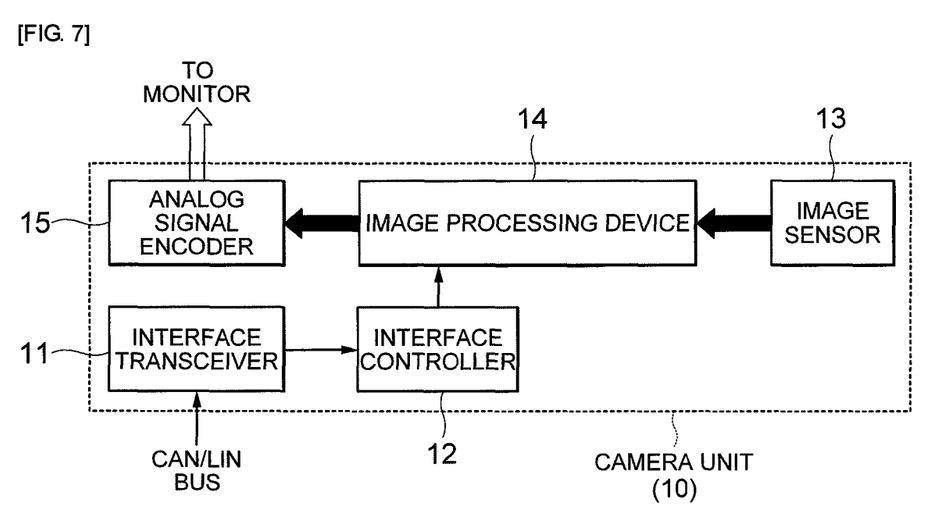
FIG. 7 is a block diagram of the camera unit according to the present invention.

The camera unit 10 is attached to the rear or front part of the vehicle, for example to the rear panel, boot lid or grill. Camera unit 10 incorporates an optical system (such as lens), at least one image sensor 13, an image processing device 14, an interface transceiver 11, an interface controller 12 and an analog signal encoder 15 (FIG. 7). However, other architectures are possible, such as the architecture where the interface controller 12 and the interface transceiver 11 are combined in the same means, or the analog signal encoder 15 may be a part of the image processing device 14, etc. All these variations are obvious to a person skilled in the art, and may be realized without departing from the scope of the present inventive concept.

The field of view of the optical system incorporated into the camera unit 10 covers a certain area behind or in front of the vehicle. The image sensor 13 captures the image projected by the optical system on its surface. The digitized image is transmitted over commonly used digital interface, for example, 8/10 bit parallel interface, or serial interface, to the image processing device 14.

The descriptor of steering angle is transmitted over the interface bus (typically CAN/LIN bus), and acquired by the interface transceiver 11. Then, the descriptor is sent to the interface controller 12.

The interface controller 12 incorporates the microprocessor, RAM, and non-volatile memory, such as ROM or flash memory.

A set of parameters for each value of steering angle descriptor is stored in the non-volatile memory. For example, if the range of steering angle values is −35 . . . +35° with the increment 50, then 15 sets of parameters are stored in the non-volatile memory. For the values of steering angle falling between the specified ones, the parameters are calculated using linear interpolation.

The interface controller 12 selects a set of parameters accordingly to the steering angle descriptor acquired from the interface transceiver 11.

The set of parameters stored in the non-volatile memory includes x and y coordinates of the control points.

Control points define one or several Bezier curves, according to the following equations:

$$X(t)=X_0(1-t)^2+X_1 2t(1-t)+X_2 t^2$$

$$Y(t)=Y_0(1-t)^2+Y_1 2t(1-t)+Y_2 t^2 \quad (1)$$

where $X_0$, $Y_0$, $X_1$, $Y_1$, $X_2$, and $Y_2$ are the coordinates of control points, and t is a parameter, changing in the range of [0, 1].

According to another embodiment of the invention, instead of quadratic Bezier curve, cubic Bezier curve may be used. In this case it is defined by the following equations:

$$X(t)=X_0(1-t)^3+X_1 3t(1-t)^2+X_2 3t^2(1-t)+X_3 t^3$$

$$Y(t)=Y_0(1-t)^3+Y_1 3t(1-t)^2+Y_2 3t^2(1-t)+Y_3 t^3 \quad (2)$$

where $X_0$, $Y_0$, $X_1$, $Y_1$, $X_2$, $Y_2$, $X_3$, and $Y_3$ are the coordinates of control points, and t is a parameter, changing in the range of [0, 1].

Microprocessor incorporated in the interface controller 12 calculates the values of X and Y using equations (1) or (2) for each Bezier curve. Parameter t varies from 0 to 1 with a certain predefined increment. For example, if the increment is 1/10, then 11 nodes, defined by their coordinates on the image X and Y, will be generated for each Bezier curve.

Note, that as soon as the equations (1) and (2) contain only simple operations—multiplication and addition, and the number of nodes can be kept relatively small (10-30 nodes per Bezier curve is enough for approximation of driving corridor with sufficiently high precision), a microprocessor embedded in nearly any existing at the moment interface controller is capable of doing the calculations within several milliseconds, which sufficiently fast to support the required frame rate 30 frames per second.

Also, note that the number of parameters per set to be stored in the non-volatile memory is as small as 6 for each quadratic Bezier curve, or 8 for each cubic Bezier curve. Therefore, these parameters may be stored in the non-volatile memory available in nearly any state of the art interface controller.

The calculated coordinates of the nodes are transmitted to the image processing device 14 over I²C interface, or any other interface established between the interface controller 12 and the image processing device 14. As soon as the number of nodes is relatively small, the bit rate of nearly any state of the art interface bus, including I²C, is sufficient to transmit the data within one frame period.

Figure 9:
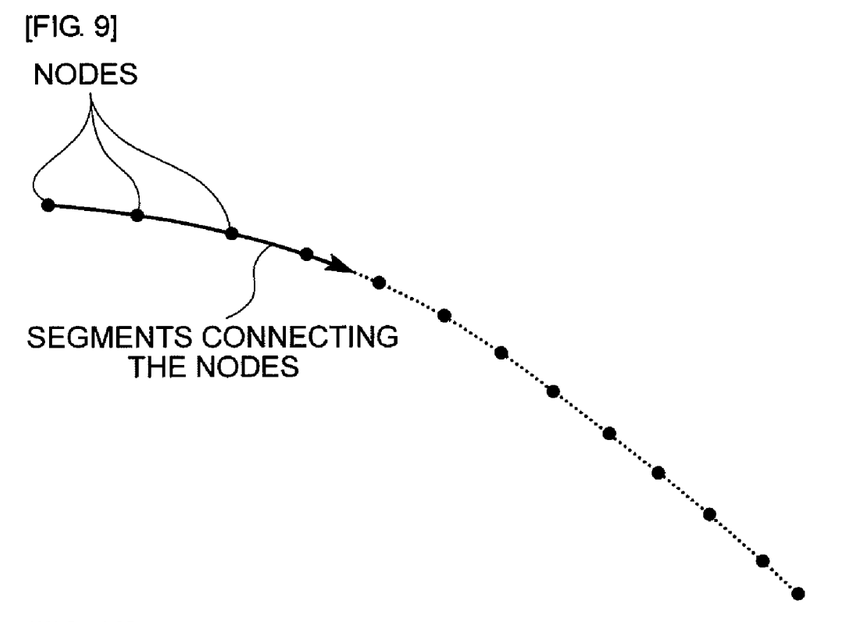
FIG. 9 illustrates the driving corridor marker generated by means of connecting the nodes with the segments.

Image processing device 14, preferably small form factor FPGA, CPLD or ASIC generates the driving corridor markers using the nodes acquired from the interface controller 12, as illustrated in FIG. 9. In the preferred embodiment of the invention, a widely known Bresenham's line algorithm is used to connect the nodes with the segments. However, a number of other algorithms may be used without departing from the scope of the present invention.

As soon as the hardware implementation of Bresenham's line algorithm does not require large logic size, low cost devices featuring small size packaging may be used for image processing device.

On the other hand, Bresenham's line algorithm also does not require high processing power for calculation, therefore small packaging size low cost DSP devices may be used for DSP implementation of the image processing device.

Finally, the generated line segments are superimposed by the image processing device 14 on the image acquired from the sensor 13. The resulting image is transmitted to analog signal encoder 15, converted into analog form, transmitted to the monitor and displayed.

Figure 8:
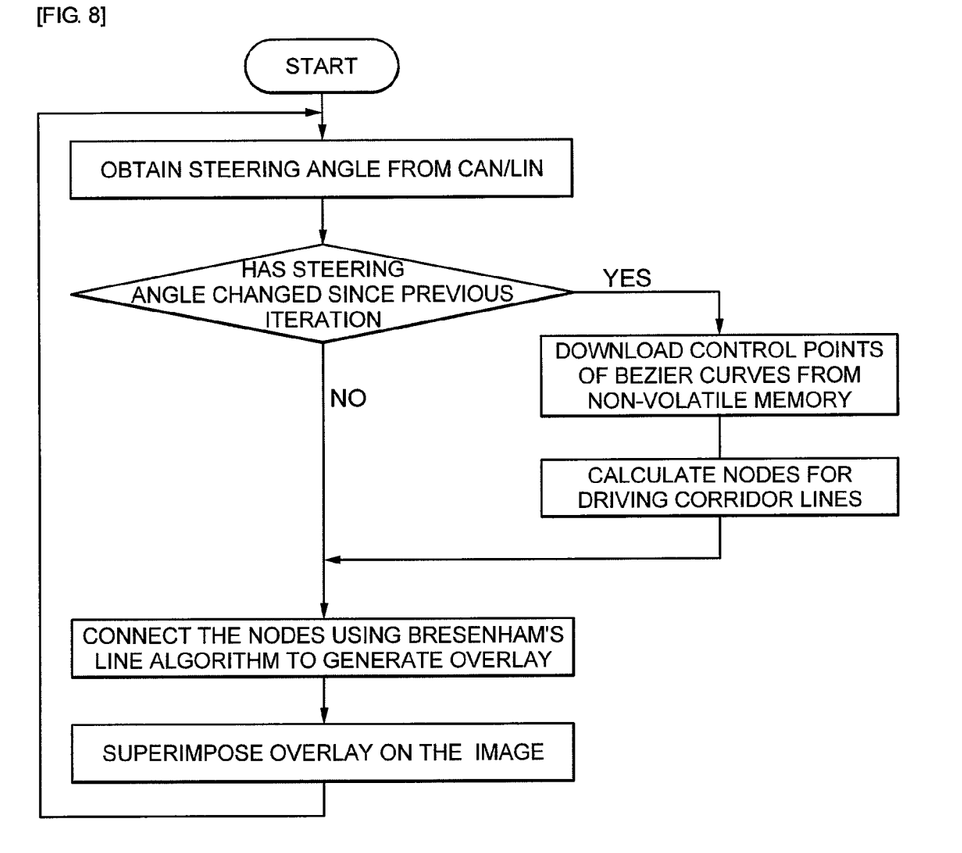
FIG. 8 is a flow chart of the dynamic overlay method according to the present invention.

The flow chart of the method is shown in FIG. 8. Namely, FIG. 8 illustrates a flow chart of the dynamic overlay method according to the present invention.

First, as shown in FIG. 8, certain steering angle of a vehicle is obtained from CAN/LIN.

Then, it should be determined whether or not the steering angle has been changed since previous iteration.

In case where the steering angle has been changed since previous iteration, control points of Bezier curves are downloaded from non-volatile memory in the interface controller 12, and then nodes for driving corridor lines are calculated based on the control points as downloaded and one of the equations (1) and (2) as previously defined. Meanwhile, if the steering angle has not been changed, aforementioned calculation is not performed.

Such calculated nodes are transmitted to the image processing device 14 and are connected each other in the same device 14 by using Bresenham's line algorithm to generate overlay.

Finally, the overlay is superimposed on the image captured by the sensor 13.

It is common to carry out the camera adjustment after it has been installed in the vehicle to compensate the imperfection of the parts, fastenings and the assembly, in order to achieve minimum deviation of the displayed driving corridor from the real trajectory. According to the preferred embodiment of the invention, the adjustment can be made by changing the control points of Bezier curves stored in the non-volatile memory. This may be done, for example, by using test/adjustment chart. The necessary calculations may be carried out by the external device, such as computer, or by the image processing device incorporated into the camera.

An Example of the Preferred Embodiment

Let us assume the steering angle varies from −35° to +35°, and 0° corresponds to the straight motion of the vehicle. The image size is 720×480 pixels, with the origin in the left upper corner of the screen. The driving corridor markers are approximated by two quadratic Bezier curves, with their control points specified for each 5° of steering angle:

| Parameter set # | Steering angle, ° | Coordinates of control points ||||||
|---|---|---|---|---|---|---|---|
| | | $X_0$ | $Y_0$ | $X_1$ | $Y_1$ | $X_2$ | $Y_2$ |
| Bezier curve 1 (left) ||||||||
| 1 | −35 | 44 | 440 | 182 | 242 | 20 | 240 |
| 2 | −30 | 46 | 440 | 202 | 246 | 76 | 215 |
| 3 | −25 | 51 | 440 | 220 | 230 | 126 | 193 |
| 4 | −20 | 54 | 440 | 232 | 222 | 173 | 178 |
| 5 | −15 | 57 | 440 | 245 | 214 | 212 | 166 |
| 6 | −10 | 60 | 440 | 257 | 205 | 242 | 159 |
| 7 | −5 | 63 | 440 | 265 | 195 | 275 | 156 |
| 8 | 0 | 66 | 440 | 267 | 190 | 298 | 156 |
| 9 | 5 | 69 | 440 | 278 | 183 | 331 | 152 |
| 10 | 10 | 71 | 440 | 282 | 178 | 366 | 148 |
| 11 | 15 | 72 | 440 | 294 | 168 | 396 | 147 |
| 12 | 20 | 72 | 440 | 294 | 164 | 425 | 152 |
| 13 | 25 | 73 | 440 | 296 | 162 | 458 | 154 |
| 14 | 30 | 75 | 440 | 298 | 162 | 493 | 160 |
| 15 | 35 | 77 | 440 | 300 | 162 | 536 | 162 |
| Bezier curve 2 (right) ||||||||
| 1 | −35 | 632 | 440 | 409 | 162 | 173 | 162 |
| 2 | −30 | 634 | 440 | 411 | 162 | 216 | 160 |
| 3 | −25 | 636 | 440 | 413 | 162 | 251 | 154 |
| 4 | −20 | 637 | 440 | 415 | 164 | 284 | 152 |
| 5 | −15 | 637 | 440 | 415 | 168 | 313 | 147 |
| 6 | −10 | 638 | 440 | 427 | 178 | 343 | 148 |
| 7 | −5 | 640 | 440 | 431 | 183 | 378 | 152 |
| 8 | 0 | 643 | 440 | 450 | 190 | 420 | 156 |
| 9 | 5 | 646 | 440 | 455 | 195 | 445 | 156 |
| 10 | 10 | 649 | 440 | 463 | 205 | 478 | 159 |
| 11 | 15 | 652 | 440 | 475 | 214 | 508 | 166 |
| 12 | 20 | 655 | 440 | 488 | 222 | 547 | 178 |
| 13 | 25 | 658 | 440 | 500 | 230 | 594 | 193 |
| 14 | 30 | 663 | 440 | 518 | 246 | 644 | 215 |
| 15 | 35 | 665 | 440 | 538 | 242 | 700 | 240 |

The parameters (coordinates of control points) are stored in non-volatile memory of the interface controller 12 in the form of look-up table with as few as 15 entries. Total size of the look-up table is 180 values (15 entries, 12 values per entry) or 360 bytes (assuming each value takes 2 bytes of memory to store).

Let us assume a new value of steering angle transmitted by the interface transceiver 11 to the interface controller 12 is 22°. As soon as there is no corresponding value in the look-up table, the controller 12 loads the parameters for 20° and 25° (Parameter sets 12 and 13 correspondingly).

The control points of Bezier curves for the required steering angle are calculated using linear interpolation between the values loaded from the look-up table:

| $X_0$ | $Y_0$ | $X_1$ | $Y_1$ | $X_2$ | $Y_2$ |
|---|---|---|---|---|---|
| Bezier curve 1 (left) ||||||
| 72 | 440 | 295 | 163 | 438 | 153 |
| Bezier curve 2 (right) ||||||
| 656 | 440 | 493 | 225 | 566 | 184 |

Using equation (1), the coordinates of the nodes are calculated by the interface controller 12. Suppose parameter t changes from 0 to 1 with the increment 0.1. Then, the coordinates of 11 nodes will be calculated for each of the two Bezier curves:

| | | Coordinates | | | |
|---|---|---|---|---|---|
| | | Bezier curve 1 (left) | | Bezier curve 2 (right) | |
| Node | t | X(t) | Y(t) | X(t) | Y(t) |
| 1 | 0.0 | 72 | 440 | 656 | 440 |
| 2 | 0.1 | 116 | 387 | 626 | 399 |
| 3 | 0.2 | 158 | 340 | 600 | 361 |
| 4 | 0.3 | 199 | 298 | 579 | 327 |
| 5 | 0.4 | 238 | 261 | 563 | 296 |
| 6 | 0.5 | 275 | 230 | 552 | 269 |
| 7 | 0.6 | 311 | 204 | 545 | 245 |
| 8 | 0.7 | 345 | 183 | 543 | 224 |
| 9 | 0.8 | 378 | 168 | 546 | 207 |
| 10 | 0.9 | 409 | 158 | 554 | 194 |
| 11 | 1.0 | 438 | 153 | 566 | 184 |

Figure 10:
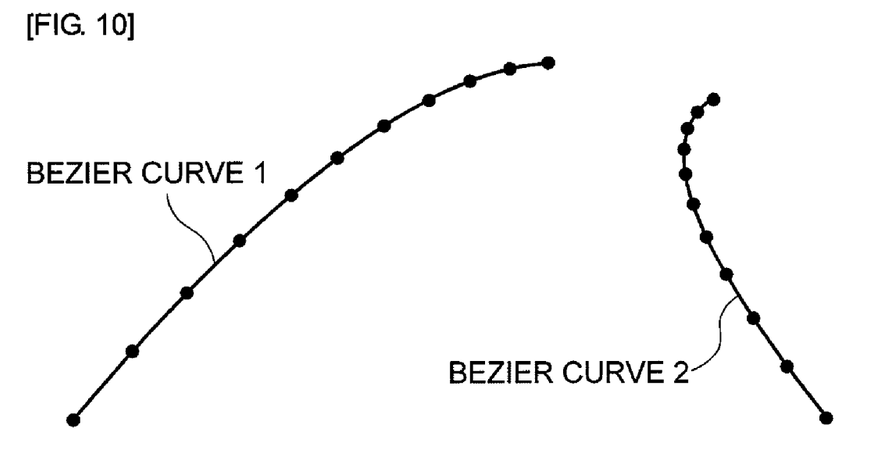
FIG. 10 shows an example of driving corridor markers generated by means of the method according to the present invention.

Then, the 44 coordinates of the nodes are transmitted via I²C interface to the image processing device 14 (small size FPGA chip). The adjacent nodes are connected by the line segments using hardware implementation of Bresenham's line algorithm described in [J. E. Bresenham, "Algorithm for computer control of a digital plotter," IBM Systems Journal, Vol. 4, No. 1, January 1965, pp. 25-30] to form the overlaid image. The result is shown in FIG. 10. In its turn, the overlaid image is superimposed on the image acquired from the sensor and the resulting image is displayed to the driver.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

A lot of other embodiments fall within the scope of the present inventive concept.

What is claimed is:

1. A camera unit with driving corridor display functionality for a vehicle, comprising:
    an image sensor configured to obtain an image outside the vehicle;
    an interface controller configured to generate a plurality of nodes of a driving corridor markers for a required steering angle, the plurality of nodes being calculated from a set of control points of Bezier curve for the required steering angle and the set of control points being stored in a non-volatile memory in a form of look-up table; and
    an image processing device configured to generate the driving corridor markers and to superimpose the driving corridor markers on the image transmitted from the image sensor, the driving corridor markers being calculated on the basis of coordinates of the nodes transmitted from the interface controller and being generated by connecting the nodes adjacent to each other with line segments.

2. The camera unit for a vehicle according to claim 1, wherein the image sensor, the interface controller and the image processing device are all embedded in one camera unit.

3. The camera unit for a vehicle according to claim 1, wherein the plurality of nodes is calculated by the following quadratic Bezier curve equation:

$$X(t)=X_0(1-t)^2+X_1 2t(1-t)+X_2 t^2$$

$$Y(t)=Y_0(1-t)^2+Y_1 2t(1-t)+Y_2 t^2$$

where $X_0, Y_0, X_1, Y_1, X_2$, and $Y_2$ are the coordinates of control points, and t is a parameter, changing in the range of [0, 1].

4. The camera unit for a vehicle according to claim 1, wherein the plurality of nodes is calculated by the following cubic Bezier curve equation:

$$X(t)=X_0(1-t)^3+X_1 3t(1-t)^2+X_2 3t^2(1-t)+X_3 t^3$$

$$Y(t)=Y_0(1-t)^3+Y_1 3t(1-t)^2+Y_2 3t^2(1-t)+Y_3 t^3$$

where $X_0, Y_0, X_1, Y_1, X_2, Y_2, X_3$, and $Y_3$ are the coordinates of control points, and t is a parameter, changing in the range of [0, 1].

5. The camera unit for a vehicle according to claim 1, wherein the control points of Bezier curve for the required steering angle are calculated using linear interpolation between the values loaded from the look-up table.

6. The camera unit for a vehicle according to claim 1, wherein the line segments connecting the nodes adjacent to each other of the set of nodes calculated and transmitted from the interface controller are calculated using the Bresenham's line algorithm.

7. The camera unit for a vehicle according to claim 1, further comprising an interface transceiver configured to receive and transmit a signal corresponding to a varying steering angle, the interface transceiver being outside the interface controller separately or being a part of the interface controller.

8. The camera unit for a vehicle according to claim 1, further comprising an analog signal encoder configured to transmit the obtained image with driving corridor markers superimposed on it to an external display device, the analog signal encoder being outside the image processing device separately or being a part of the image processing device.

9. A method for displaying anticipated trajectory of a vehicle, comprising the steps:
    detecting a variation of steering angle of a vehicle;
    loading or calculating a set of control points of Bezier curve being stored in a non-volatile memory in a form of look-up table according to the variation of steering angle, and calculating a plurality of nodes using Bezier curve equation, the plurality of nodes being used for generating a driving corridor markers on the basis of the loaded or calculated set of control points;
    calculating line segments and connecting the nodes adjacent to each other with the line segments; and
    superimposing an overlay with the line segments on an image obtained by an image sensor and displaying the superimposed image on an external display device.

10. The method according to claim 9, wherein the plurality of nodes is calculated by the following quadratic Bezier curve equation:

$$X(t)=X_0(1-t)^2+X_1 2t(1-t)+X_2 t^2$$

$$Y(t)=Y_0(1-t)^2+Y_1 2t(1-t)+Y_2 t^2$$

where $X_0, Y_0, X_1, Y_1, X_2$, and $Y_2$ are the coordinates of control points, and t is a parameter, changing in the range of [0, 1].

11. The method according to claim 9,
wherein the plurality of nodes is calculated by the following cubic Bezier curve equation:

$$X(t)=X_0(1-t)^3+X_1 3t(1-t)^2+X_2 3t^2(1-t)+X_3 t^3$$

$$Y(t)=Y_0(1-t)^3+Y_1 3t(1-t)^2+Y_2 3t^2(1-t)+Y_3 t^3$$

where $X_0, Y_0, X_1, Y_1, X_2, Y_2, X_3$, and $Y_3$ are the coordinates of control points, and t is a parameter, changing in the range of [0, 1].

12. The method according to claim 9,
wherein in case where the look-up table does not have the data for the required steering angle, the control points of Bezier curve are calculated using linear interpolation between the values stored in the look-up table.

13. The method according to claim 9, wherein calculation of the node is performed in an interface controller using Bezier curve equation while calculation of the line segments is performed in an image processing device using the Bresenham's line algorithm.

14. The method according to claim 9, wherein both calculation of the plurality of nodes and calculation of the line segments are all performed in one camera unit.

15. A system for generating driving corridor markers which are displayed to be superimposed on an image of the vehicle's periphery, wherein the driving corridor markers are dynamically-changed and overlaid to the image obtained by an image sensor in a camera unit according to variation of steering angle and the dynamic change of the markers is generated from calculation of coordinates of a plurality of nodes according to one of the following quadratic and cubic Bezier curve equations and calculation of line segments connecting the plurality of nodes:

$$X(t)=X_0(1-t)^2+X_1 2t(1-t)+X_2 t^2$$

or $$Y(t)=Y_0(1-t)^2+Y_1 2t(1-t)+Y_2 t^2$$

$$X(t)=X_0(1-t)^3+X_1 3t(1-t)^2++X_2 3t^2(1-t)+X_3 t^3$$

$$Y(t)=Y_0(1-t)^3+Y_1 3t(1-t)^2++Y_2 3t^2(1-t)+Y_3 t^3$$

where $X_0, Y_0, X_1, Y_1, X_2, Y_2, X_3$, and $Y_3$ are the coordinates of control points, and t is a parameter, changing in the range of [0, 1], and wherein the plurality of nodes is calculated from a set of control points of Bezier curve according to the variation of steering angle and the set of control points is stored in a non-volatile memory in a form of look-up table.

16. A system for generating driving corridor markers according to claim 15, wherein the plurality of nodes is calculated by an interface controller outside an image processing device.

17. A system for generating driving corridor markers according to claim 16, wherein connecting the plurality of nodes with the line segments is performed by the image processing device.

18. A system for generating driving corridor markers according to claim 17, wherein the interface controller and the image processing device are all embedded in one camera unit.

* * * * *